United States Patent [19]
Kikuchi

[11] Patent Number: 4,596,448
[45] Date of Patent: Jun. 24, 1986

[54] OPTICAL SYSTEM SUPPORT AND POSITIONING DEVICE FOR USE IN AN OPTICAL READING APPARATUS

[75] Inventor: Ikuya Kikuchi, Saitama, Japan

[73] Assignee: Pioneer Electronic Corporation, Tokyo, Japan

[21] Appl. No.: 559,536

[22] Filed: Dec. 8, 1983

[30] Foreign Application Priority Data

Dec. 8, 1982 [JP] Japan .................. 57-214823

[51] Int. Cl.⁴ .................. G02B 7/02; G02B 7/04
[52] U.S. Cl. .................. 350/247; 350/255
[58] Field of Search .................. 350/247, 255; 369/44–45; 319/38; 248/605

[56] References Cited

U.S. PATENT DOCUMENTS

| | | | |
|---|---|---|---|
| 4,030,815 | 6/1977 | Addrevski et al. | 350/255 |
| 4,215,915 | 8/1980 | Freiberg | 350/255 |
| 4,385,373 | 5/1983 | Howe | 369/45 |
| 4,449,213 | 5/1984 | Noborimoto et al. | 369/44 |
| 4,479,051 | 10/1984 | Musha | 350/247 |

FOREIGN PATENT DOCUMENTS

146634 11/1980 Japan .................. 350/247

Primary Examiner—William H. Punter
Attorney, Agent, or Firm—Sughrue, Mion, Zinn, Macpeak & Seas

[57] ABSTRACT

An improved optical system support and positioning device for use in an optical reading apparatus, for instance, an optical or audio disc reading apparatus, in which the tracking function of the optical system is improved. An electromagnetic positioning structure moves the optical system parallel and perpendicular to the direction of the optical axis of the optical system while the optical system is supported by a support element. The support element includes a pair of cantilevered flexible members, a pair of substantially parallel support members, and an intermediate section joining ends of the flexible members and support members. In accordance with the invention, the distance between fixed ends of the support members is greater than the distance between the free ends thereof.

5 Claims, 10 Drawing Figures

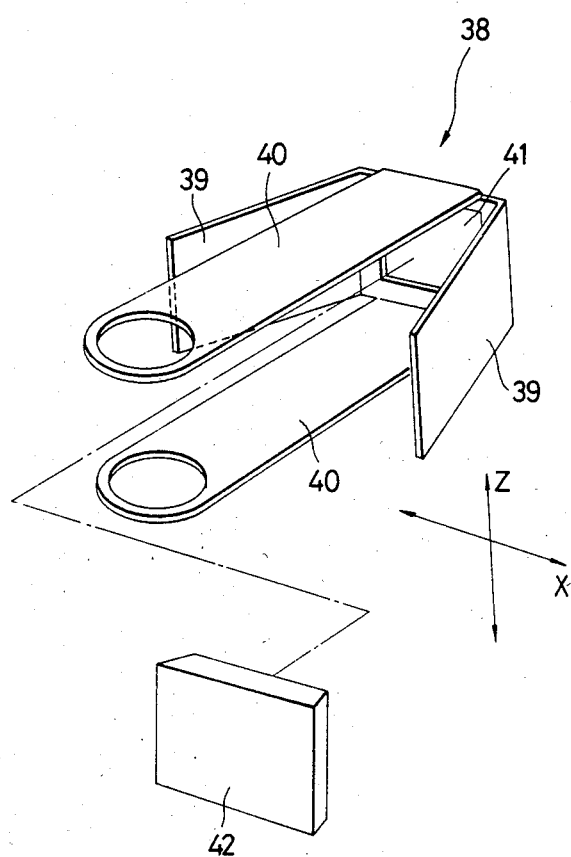

FIG. 9(a)
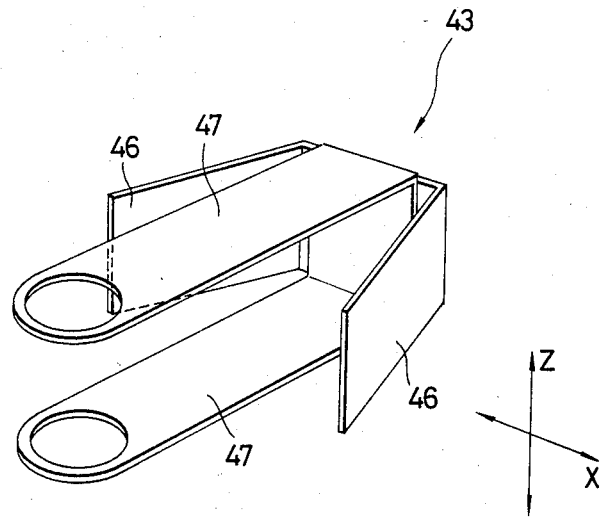
FIG. 9(b)
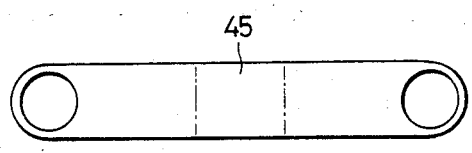
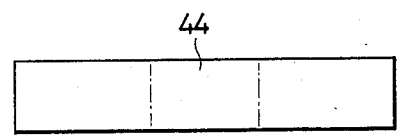

OPTICAL SYSTEM SUPPORT AND POSITIONING DEVICE FOR USE IN AN OPTICAL READING APPARATUS

BACKGROUND OF THE INVENTION

The present invention relates to an optical system support and positioning device for use in an apparatus for optically reading informations recorded on an optical disc information recorded on an optical disc or the like.

In an apparatus for optically reading information, information is recorded on a disc, such as a video disc or a digital audio disc, in the form of minute pits arranged in a spiral track on the disc surface. When a disc is reproduced, a beam of light is directed onto the track and the disc is rotated at a predetermined speed. The intensity of the reflected light or transmitted light is converted into an electrical signal, thereby reproducing the original information signal.

For the reproduction of such a disc, the light beam must be correctly focused on the recording surface of the disc. This requires positional control (focus servo) in a direction perpendicular to the recording surface of an optical system, that is, in the focusing direction. Further, the light beam should be controlled (tracking servo) radially of the disc, that is, in a tracking direction, in order to cause the light beam to always correctly follow the recording track. To this end, an optical system driving device for use in such an apparatus for optically reading information includes a support mechanism for movably supporting the optical system which controls the reading light beam and a positioning mechanism for controlling the position of the optical system in the focusing and tracking directions in response to focusing error and tracking error signals. Various types of such optical system support and positioning mechanisms have been heretofore proposed, one of which is illustrated in FIGS. 1 and 2.

As shown therein, an optical system 3 having an objective lens 1 and a barrel 2 is supported by a support element 4 so as to be movable in two directions, namely, a focusing direction Z parallel to the optical axis of the optical system 3 and tracking direction X perpendicular to the focusing direction. The support element 4 is composed of a pair of cantilevered flexible members 6 arranged parallel to one another with each having a first end fixed to a frame 5. An intermediate member 7 is arranged between the second, free ends of the flexible members. Support members 8 having one end connected to the intermediate member 7 extend in the direction of the fixed ends of the flexible members 6. The other ends of the support members 8 are connected to the optical system 3. The flexible members 6 and the support members 8 can flex only in the tracking direction X and the focusing direction Z. Reference numeral 9 indicates a rigid member. A coil 11, which is used to generate a force acting in the focusing direction Z, is wound on a bobbin 10 mounted downwardly of the barrel 2. A pair of coils 13, for producing movement in the tracking direction X, are wound on corresponding bobbins 12 which extend in the tracking direction X. Magnetic circuits 14 and 15, rigidly mounted on the frame 5, provide an electromagnetic driving force for the coils 11 and 13.

A disadvantage in this optical support and positioning device is that when the optical system is driven in the tracking direction, the optical system undergoes a desired parallel movement only when the frequency of the driving excitation current is low. When the frequency is above a certain critical point, due to a disturbance in the responsive frequency characteristics of the system, the optical system is caused to rotate.

It is, therefore, an object of the present invention to provide an optical system support and positioning device which causes no disturbance of responsive frequency characteristics and hence provides parallel movement at all frequencies of the driving excitation current.

SUMMARY OF THE INVENTION

An optical system support and positioning device according to the invention includes an optical system for directing a reading light beam onto a recording surface of a recording medium, positioning means for positioning the optical system in the direction of the optical axis thereof and in a second direction perpendicular to the direction of the optical axis, and a support element for supporting the optical system as it moves in the direction of the optical axis and the vertical direction perpendicular thereto so as to maintain the beam perpendicular to the recording surface. The support element includes a pair of flexible members mounted in a cantileveled arrangement which flex in the second direction, an intermediate section extending between free ends of the flexible members, and a support element, one end of which is fixed to the intermediate section and movably supports the optical system in only the direction of the optical axis at the other end. The distance between the fixed ends is greater than the distance between the free ends.

BRIEF DESCRIPTION OF THE DRAWINGS

FIGS. 7, 8 and 9(a) are views similar to FIG. 5 but depicting respective second, third and fourth embodiments of a support element of the invention; and FIG. 9(b) shows the two members of the support element of FIG. 9(a) in an unfolded view.

DESCRIPTION OF THE PREFERRED EMBODIMENTS

Figure 1:
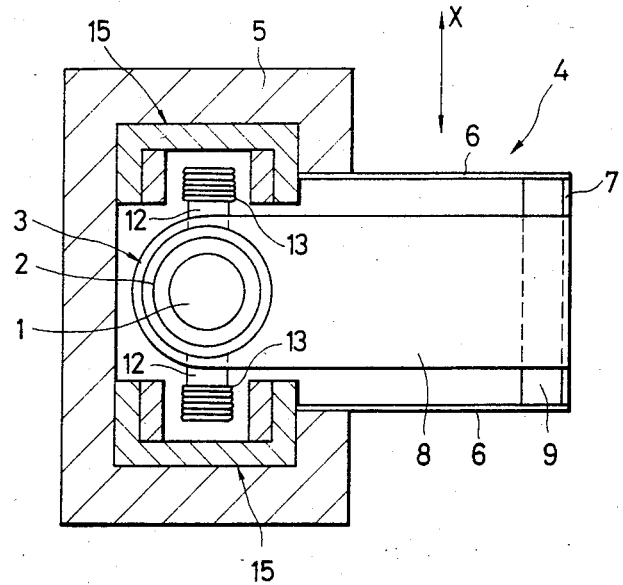
FIGS. 1 and 2 show an optical system driving apparatus according to the prior art.
Figure 2:
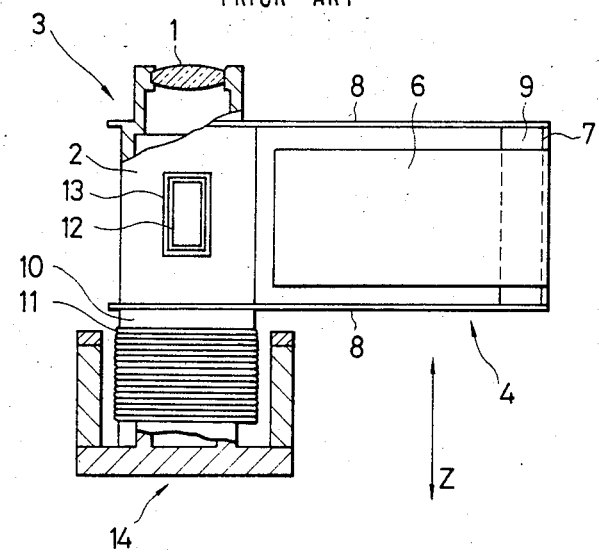
Figure 3:
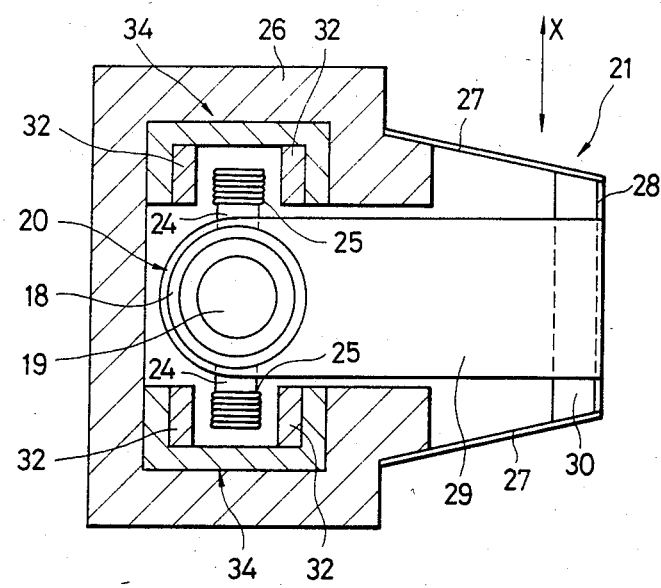
FIGS. 3 and 4 are plan and side views, respectively, of a first embodiment of the present invention, partially in section.
Figure 4:
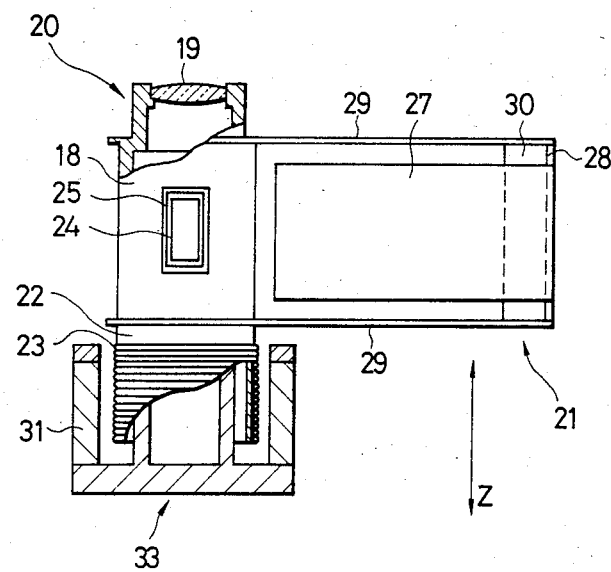

A preferred embodiment of an optical support and positioning device according to the invention will be described with reference to the accompanying drawings.

FIGS. 3, 4, 5 and 6 show a first embodiment of the invention. As shown therein, an optical system 20, which includes a barrel 18 and an object lens 19 fitted into the barrel, is supported by a support element 21 in such a manner as to be movable within a predetermined range in two directions, particularly, (1) a direction parallel to the optical axis of the optical system 20, that is, in a focusing direction Z, and (2) a tracking direction X perpendicular to the focusing direction. A coil 23, which effects movement in the focusing direction Z, is wound on a bobbin 22 mounted downwardly of the barrel 18. A pair of rectangular bobbins 24 extend in the tracking direction X. Coils 25 are wound on the bobbins 24.

Figure 5:
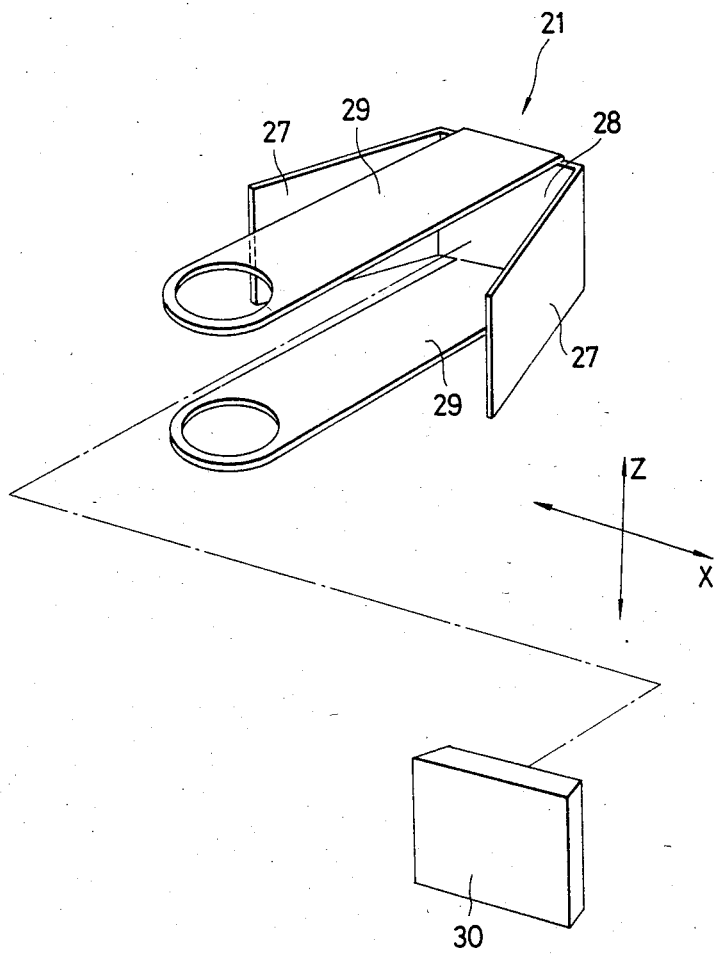
FIG. 5 is a fragmentary perspective view showing a support element used in the device of FIGS. 3 and 4.

The support element 21 as shown in FIG. 5 is composed of a pair of cantilevered flexible members 27, one end of each of which is secured to a frame 26. An intermediate member 28 in plate form extends between the respective other ends of the flexible members. Parallel support members 29, first ends of which are secured to the upper and lower sides of the intermediate member 28, have apertured outer ends in which are mounted the barrel of the optical system 3. The flexible members 27 and the support members 29 can flex only in the tracking and focusing directions X and Z. The distance between the fixed ends of the flexible members 27 is greater than the distance between the free ends of the flexible members 27. A rigid member 30 of substantially trapezoidal cross section is provided to improve the interconnection between the flexible members 27, intermediate member, and the support member 30. The rigid member 30 is secured to these three members.

Magnetic circuit members 33 and 34, which incorporate magnets 31 and 32 therein, are provided to apply electromagnetic driving forces to the driving coils 23 and 25. The magnetic circuit members 33 and 34 are fixed to the frame 26. A magnetic gap of a predetermined width is provided between the driving coil 23 and the magnetic coil 33 and the magnetic circuit 33 and between the driving coil 25 and the magnetic circuit 34.

Figure 6:
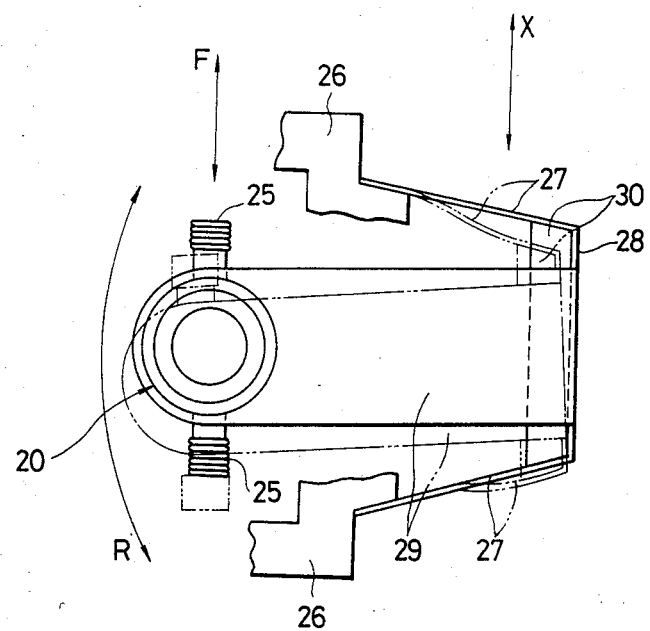
FIG. 6 is an explanatory diagram illustrating the operation of the embodiment of FIGS. 3 and 4.

A current of appropriate magnitude is supplied to the driving coil 23 to drive the optical system 20 in the focusing direction Z simultaneously with causing the support member to be flexed in the same direction. Current supplied to the driving coil 25 drives the optical system 20 in the tracking direction X. However, the optical system 20 cannot undergo parallel movement (movement in a direction parallel to the optical axis) since the distance between the fixed ends of the flexible members 27 is greater than the distance between the free ends thereof. As shown in FIG. 6, the optical system 20 is driven in the tracking direction X with the driving force in that direction being derived from the current supplied to the driving coil 25. When the optical system is so driven, the flexible members 27 are deformed as shown by a dot-and-dash line in FIG. 6 so that the optical system 20 only rotates (movement in the direction R) about a vertical fulcrum.

Figure 7:
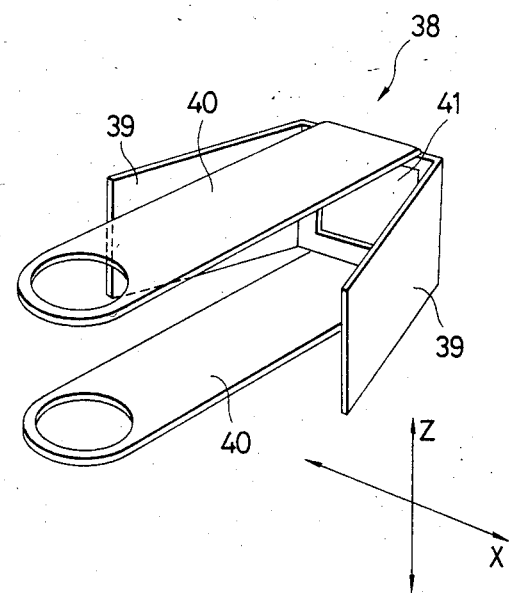

FIG. 7 shows a second embodiment of the invention. In this embodiment, a support element 38 for supporting the optical system is formed integrally of a flexible members 39 and a support member 40 which can flex in the tracking direction X and the focusing direction Z. The element 38 can be made of plastic and formed by punching a plastic blank. The intersection between the flexible members 39 and the support member 40 is provided with an opening 41 for the purpose of rendering the support element 38 light in weight. The size of the hole 41 should be limited so that the mechanical strength of the support mechanism is not lost.

The second embodiment is otherwise similar to the first embodiment.

According to the second embodiment, the support element is fabricated as an integral unit to reduce the number of the parts and to facilitate machining and assembly operations, thereby involving less cost.

FIG. 8 illustrates a third embodiment of the invention, wherein a rigid member 42 is firmly mounted at the intersection between the flexible members 39 and the support member 40 of a support element 38 as shown in FIG. 7 to thus stiffen the interconnection between the flexible members 39 and the support member 40. In this construction, the rigid member 42 provided at the interconnection between the flexible members 38 and the support member 39 secures positive action of the support mechanism 38 in driving the optical system.

A fourth embodiment of the invention as shown in FIGS. 9(a) and 9(b). According to the fourth embodiment, a support element 43 is fabricated from two plate blanks 44 and 45, each of predetermined form, by punching or the like. The plate blanks are rigidly mounted in a crossed form by, for example, welding, and they are then subjected to plastic processing to obtain flexible members 46 and support member 47 which are flexible only in the tracking direction X and the focusing direction Z.

As described above, the inventive optical system support and positioning device for an apparatus for optically reading information is designed so that the distance between the fixed ends of the flexible members is greater than the distance between the free ends thereof. Due to this reason, the optical system will always correctly effect rotational movement for all expected frequencies of driving current when the optical system is driven in the tracking direction. Further, the use of the invention eliminates a critical point with respect to the mode of movement of the optical system. In view thereof, no disturbance is involved in responsive frequency characteristics.

I claim:

1. In an optical system support and positioning device for use in an apparatus for optically reading information, comprising an optical system for providing a reading optical beam, positioning means for moving said optical system in the direction of the optical axis thereof and in a second direction perpendicular to the direction of said optical axis, and a support element for supporting said optical system movable in the direction of said optical axis and said second direction to maintain said optical axis perpendicular to said recording surface, said support element including a pair of cantilevered flexible members having fixed first ends with said flexible members being adapted to flex in said second direction, an intermediate section extending between second ends of said flexible members, and a pair of substantially parallel support members having first ends fixed to said intermediate section and second ends movably supporting said optical system to be movable only in the direction of said optical axis, wherein the improvement comprises the distance between said fixed first ends of said support members being greater than the distance between said second ends.

2. The improved optical system support and positioning device of claim 1, wherein said flexible members, said intermediate section and said support members are formed as an integral unit.

3. The improved optical system support and positioning device of claim 2, wherein an aperture is formed in said intermediate section.

4. The improved optical system support and positioning device of claim 1, further comprising a trapezoidal member positioned adjacent said intermediate section for providing additional support for said flexible members and said support members.

5. The improved optical system support and positioning device of claim 1, wherein said flexible members and said parallel support members are formed as separate units.

* * * * *